United States Patent
Samuel et al.

(10) Patent No.: US 10,738,540 B2
(45) Date of Patent: Aug. 11, 2020

(54) RHEOLOGICAL FLUID LOCK OF SHAFT TO HOUSING

(71) Applicant: Halliburton Energy Services, Inc., Houston, TX (US)

(72) Inventors: Geoffrey A. Samuel, Edmonton (CA); Neil Roy Choudhury, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 148 days.

(21) Appl. No.: 15/781,437

(22) PCT Filed: Jan. 27, 2016

(86) PCT No.: PCT/US2016/015023
§ 371 (c)(1),
(2) Date: Jun. 4, 2018

(87) PCT Pub. No.: WO2017/131647
PCT Pub. Date: Aug. 3, 2017

(65) Prior Publication Data
US 2018/0355675 A1    Dec. 13, 2018

(51) Int. Cl.
*E21B 17/02* (2006.01)
*E21B 31/06* (2006.01)
*E21B 7/06* (2006.01)
*F16D 37/00* (2006.01)

(52) U.S. Cl.
CPC ............ *E21B 17/028* (2013.01); *E21B 7/062* (2013.01); *E21B 17/02* (2013.01); *E21B 31/06* (2013.01); *F16D 37/008* (2013.01); *F16D 2037/005* (2013.01)

(58) Field of Classification Search
CPC ........ E21B 17/028; E21B 17/02; E21B 31/06; E21B 7/062; F16D 37/008; F16D 2037/005
See application file for complete search history.

(56) References Cited

U.S. PATENT DOCUMENTS

| 7,234,544 | B2 | 6/2007 | Kent |
| 8,789,579 | B2 | 7/2014 | Ollerenshaw et al. |
| 2002/0011358 | A1 | 1/2002 | Wassell |
| 2004/0231893 | A1 | 11/2004 | Kent |

(Continued)

FOREIGN PATENT DOCUMENTS

WO   2014099783   6/2014

OTHER PUBLICATIONS

International Search Report and Written Opinion of PCT Application No. PCT/US2016/015023 dated Oct. 14, 2016: pp. 1-17.

*Primary Examiner* — Wei Wang
(74) *Attorney, Agent, or Firm* — Chamberlain Hrdlicka

(57) ABSTRACT

A rheological lock apparatus includes a fluid chamber formed within a housing between a pair of seals. The fluid chamber contains a rheological fluid. An inner surface of the housing has a first plurality of splines projecting into the fluid chamber and extending longitudinally along a longitudinal dimension of the chamber. A driveshaft extends axially through the chamber such that the pair of seals are sealed against the driveshaft. The driveshaft includes a second plurality of splines. A field generator is coupled to one of the driveshaft or the housing to generate a field through the rheological fluid during times when the housing is substantially immobile in a borehole.

19 Claims, 5 Drawing Sheets

(56) References Cited

U.S. PATENT DOCUMENTS

| | | |
|---|---|---|
| 2007/0151767 A1 | 7/2007 | Downton |
| 2012/0228028 A1* | 9/2012 | Turner .................... E21B 17/07 175/56 |
| 2013/0000985 A1* | 1/2013 | Agrawal ................. E21B 41/00 175/87 |
| 2015/0078943 A1 | 3/2015 | Gunter et al. |

* cited by examiner

US 10,738,540 B2

RHEOLOGICAL FLUID LOCK OF SHAFT TO HOUSING

BACKGROUND

Directional drilling may be used in hydrocarbon well drilling for many different reasons. For example, it may be desirable to drill in a certain direction to provide multiple wells from a single location, to access geological formation areas that are inaccessible from the surface location, or to avoid undesirable formations.

In directional drilling, a driveshaft is coupled to a drill string, on an uphole side of the driveshaft, and a rotary steerable system (RSS), on a downhole side of the driveshaft. With the RSS, the drill bit is able to be steered in a desired direction using a "push-the-bit" method or a "point-the-bit" method. In the "push-the-bit" method, the driveshaft is directed to the desired direction by a reactive force imparted on the driveshaft from contact with the borehole. In the "point-the-bit" method, the driveshaft connected to the drill bit is flexed to direct the bit in the desired direction.

In the "point-the-bit" method, a reference housing through which the driveshaft extends is not connected to the driveshaft in a torsional direction to enable the driveshaft to rotate freely within the housing. This becomes a problem when the housing becomes stuck in the borehole.

DETAILED DESCRIPTION

To address some of the challenges described above, as well as others, a rheological fluid is sealed between the driveshaft and the housing. Dynamically changing the fluid from its inactive, relatively low viscosity state to an active, relatively higher viscosity state enables the rotating driveshaft to couple to the housing through the now solid-like rheological fluid. Thus, the driveshaft torque is transferred to the housing through the rheological fluid. Examples of such embodiments are now described in detail.

Rheological fluids are a type of colloid capable of varying viscosity or even solidification in response to an applied electric or magnetic field. For example, an electrorheological fluid changes state in response to an applied electric field and a magnetorheological fluid changes state in response to an applied magnetic field. The rheological variation is reversible when the field is removed. The response time from the application or removal of the field to the change in state may be in a range of milliseconds.

When the field is applied to the fluid, each solid particle in the fluid is polarized with an effective dipole moment. The resulting (induced) dipole-dipole interaction means that the particles tend to aggregate and form columns along the applied field direction. The formation of columns is the reason why the high-field state of a rheological fluid exhibits increased viscosity or even solid-like behavior. While in the solid-like state, the rheological fluid is able to sustain shear in the direction perpendicular to the applied electric field. Using this property, the present embodiments may dynamically couple or decouple the driveshaft torque to or from the housing.

Figure 1:
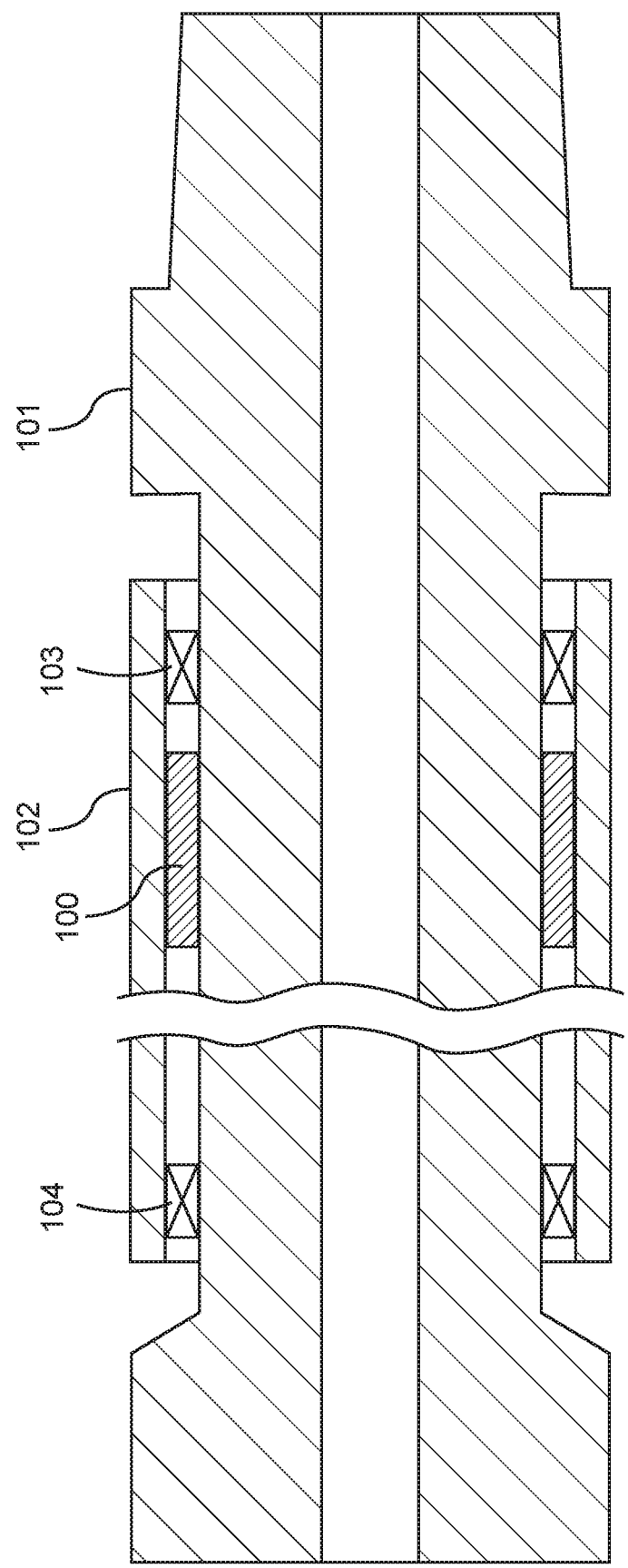
FIG. 1 is a cross-sectional diagram of a driveshaft in a housing, according to various embodiments.

FIG. 1 is a cross-sectional diagram of a driveshaft 101 in a housing 102, according to various embodiments. This diagram represents a cross sectional view of the tool in a straight condition with no steering forces imparted onto the driveshaft 101.

The left side of the figure represents the uphole side if the driveshaft 101 and the right side of the figure represents the downhole side of the driveshaft. In an embodiment, the uphole side of the driveshaft 101 is coupled to the drillstring that may be coupled to a drilling rig rotary table or a motor (e.g., mud motor) to apply a torque to the driveshaft 101. The downhole side of the driveshaft 101 may be coupled to the RSS that may be coupled to a drill bit that provides the torque to the drill bit for drilling in a geological formation.

Bearings 103, 104 are shown located on either end of the housing for purposes of illustration. The bearings locate the driveshaft 101 in the housing 102 in an axial direction along a longitudinal length of the housing 102 but allow for relative rotation between the two components 101, 102. The bearings 103, 104 may be spherical bearings to allow for radial movement of the driveshaft 101 within the housing 102 when steering forces are imparted on the driveshaft 101 for purposes of steering the drill bit (not shown).

A rheological lock apparatus 100 is shown in FIG. 1 and shown and described in greater detail with reference to FIGS. 2 and 3. While the rheological lock apparatus 100 is shown between the two bearings 103, 104, no such orientation is required. The rheological lock apparatus 100 may be located anywhere within the housing 102. It may take up only a small portion of the housing 102 or be expanded to include a larger portion of the housing 102 that is less than entire length of the housing 102.

Figure 2:
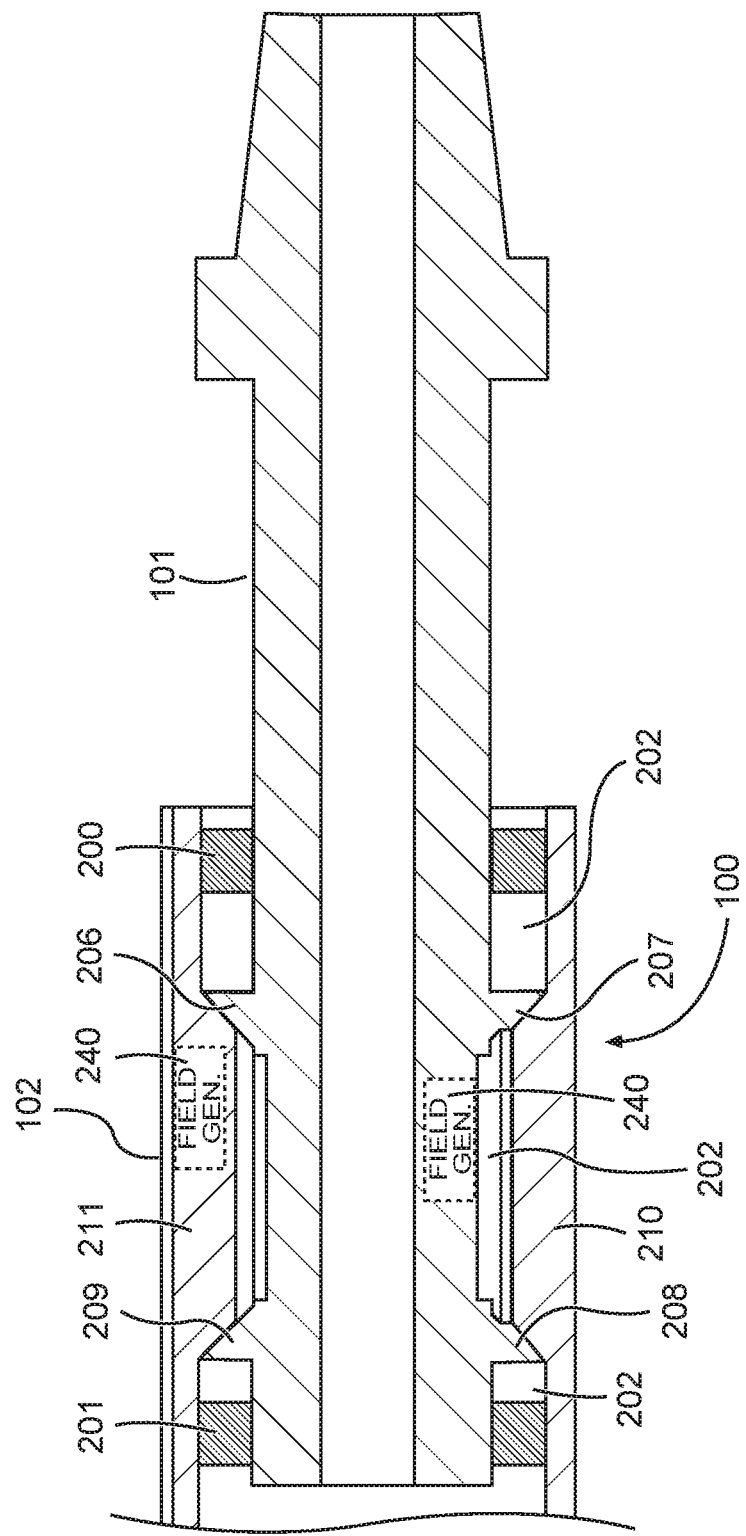
FIG. 2 is a cross-sectional diagram showing a rheological lock apparatus, according to various embodiments.

FIG. 2 is a cross-sectional diagram showing a rheological lock apparatus 100, according to various embodiments. No scale may be inferred from this figure. For purposes of clarity, only a portion of the housing comprising the apparatus is shown.

A fluid chamber 202 is shown formed in the housing between a pair of seals 200, 201. The chamber 202 contains a rheological fluid (e.g., electrorheological, magnetorheological). The seals 200, 201 may be rubber, synthetic rubber, silicone or some other pliable sealing material.

The driveshaft 101 extends axially through the chamber 202. The pair of seals 200, 201 are sealed against the driveshaft 101 at either end of the chamber 202 such that the rheological fluid is substantially sealed in the chamber 202. The driveshaft 101 comprises a plurality of splines 206-209 that extend from the driveshaft 101 into the chamber 202 and extending longitudinally along the driveshaft 101. The splines 206-209 may be coupled to the driveshaft 101 in some manner or formed integral with driveshaft 101.

A field generator (e.g., magnetic field generator, electric field generator) 240 is located in one of the housing 102 or the driveshaft 101 to generate a field radially between the housing 102 and the driveshaft 101. The field generator 240 is shown twice in FIG. 2 only for purposes of illustrating different possible locations for the generator 240. Only one field generator 240 is used for proper operation of the apparatus 100. The locations shown in FIG. 2 for the field generator 240 are for purposes of illustration only as the field generator 240 may be located in other locations of the apparatus. The field generator 240 may be an antenna, an electromagnet, or some other type of controllable field generator.

The housing 102 has an inner surface comprising a plurality of splines 210, 211 that project into the fluid chamber 202 and extend longitudinally along a longitudinal dimension of the chamber 202. The plurality of splines 210, 211 may be coupled to the housing 102 in some manner or formed integral with the housing 102.

Figure 3:
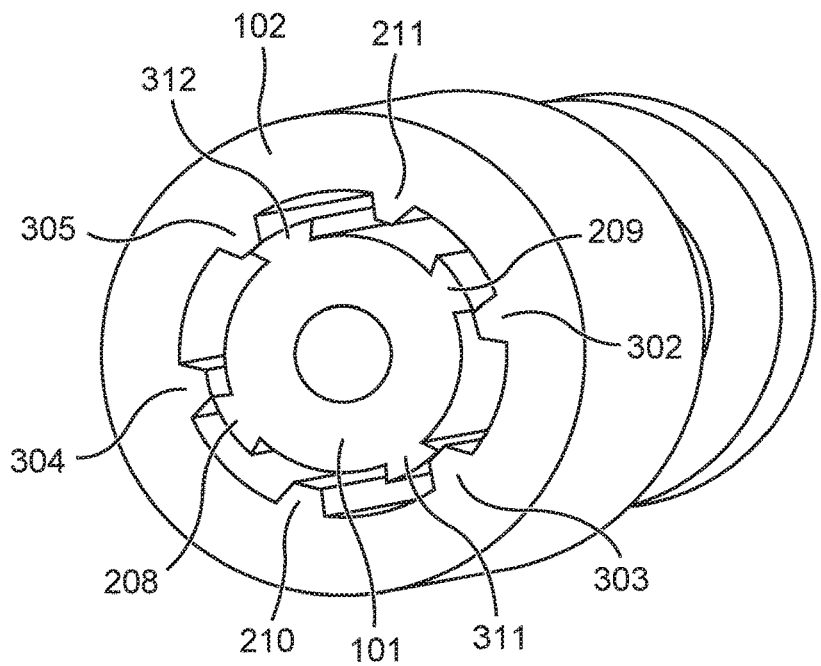
FIG. 3 is a diagram showing an end cross-sectional view of the rheological lock apparatus, according to various embodiments.

FIG. 3 is a diagram showing an end cross-sectional view of the rheological lock apparatus 100, according to various embodiments. This view shows the driveshaft 101 with the plurality of driveshaft splines 208, 209, 311, 312 that is located axially within the housing 102. The inner surface of the housing comprises the plurality of housing splines 210, 211, 302-305. Both sets of splines 208, 209, 311, 312 and 210, 211, 302-305 project into the fluid chamber, comprising the rheological fluid, from their respective component 101, 102.

In operation, the driveshaft 101 may turn freely within the housing 102 during a first, inactive mode of operation. During this mode, the field generator 240 is disabled so that the rheological fluid is in its fluid state. Thus, the housing 102 may be lowered into the borehole as the driveshaft 101 turns the drill bit to drill the borehole.

If the housing 102 becomes substantially immobile in the borehole, the field generator 240 can be energized automatically in response to the immobile housing or controlled by a surface controller during a second, active mode. The field generator generates a field through the rheological fluid during the active mode. As discussed previously, the field causes the rheological fluid to take on a solid-like state. Thus, at least a portion of the torque that is applied to the driveshaft 101 is transferred to the fluid in the solid-like state. The fluid in the solid-like state may then transfer at least the portion of the torque to the housing. The splines on both the driveshaft and the housing assist in this transfer of force.

Figure 4:
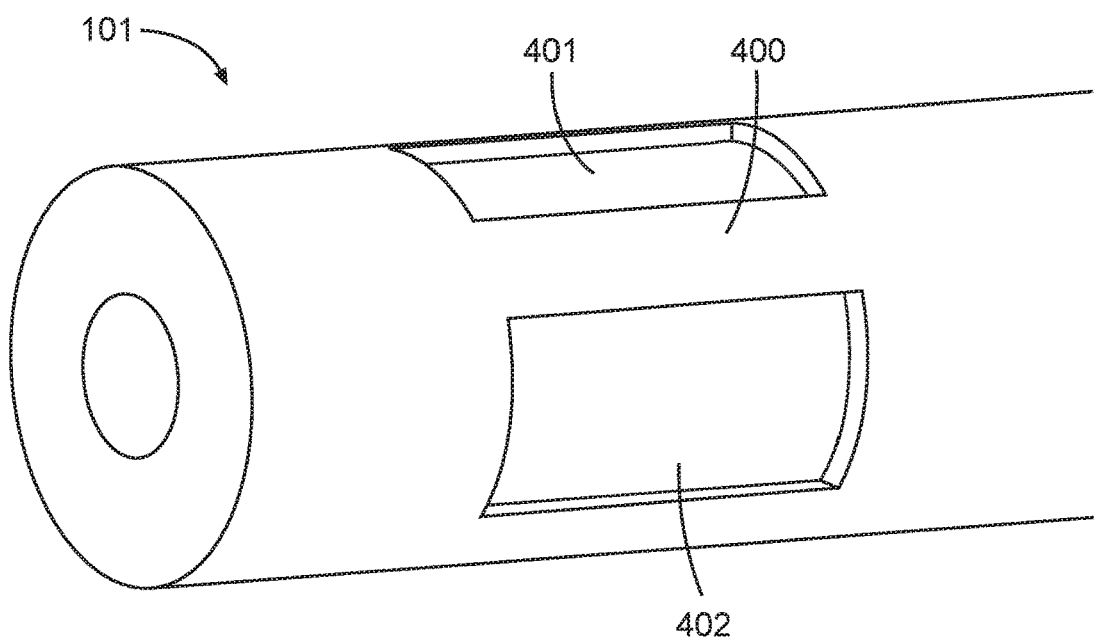
FIG. 4 is a diagram showing an embodiment of a driveshaft with pocket-formed splines, according to various embodiments.

FIG. 4 is a diagram showing an embodiment of a driveshaft with pocket-formed splines 400, according to various embodiments. In this embodiment, the splines 400 may be formed by milling pockets 401, 402 into the driveshaft 101. This forms the spline 400 between the two pockets 401, 402.

Other embodiments may form raised splines that extend from the driveshaft 101 and project into the fluid chamber. Such an embodiment may form the splines integral with the driveshaft 101 or couple the splines to the driveshaft 101 using some connection technique (e.g., welding).

Figure 5:
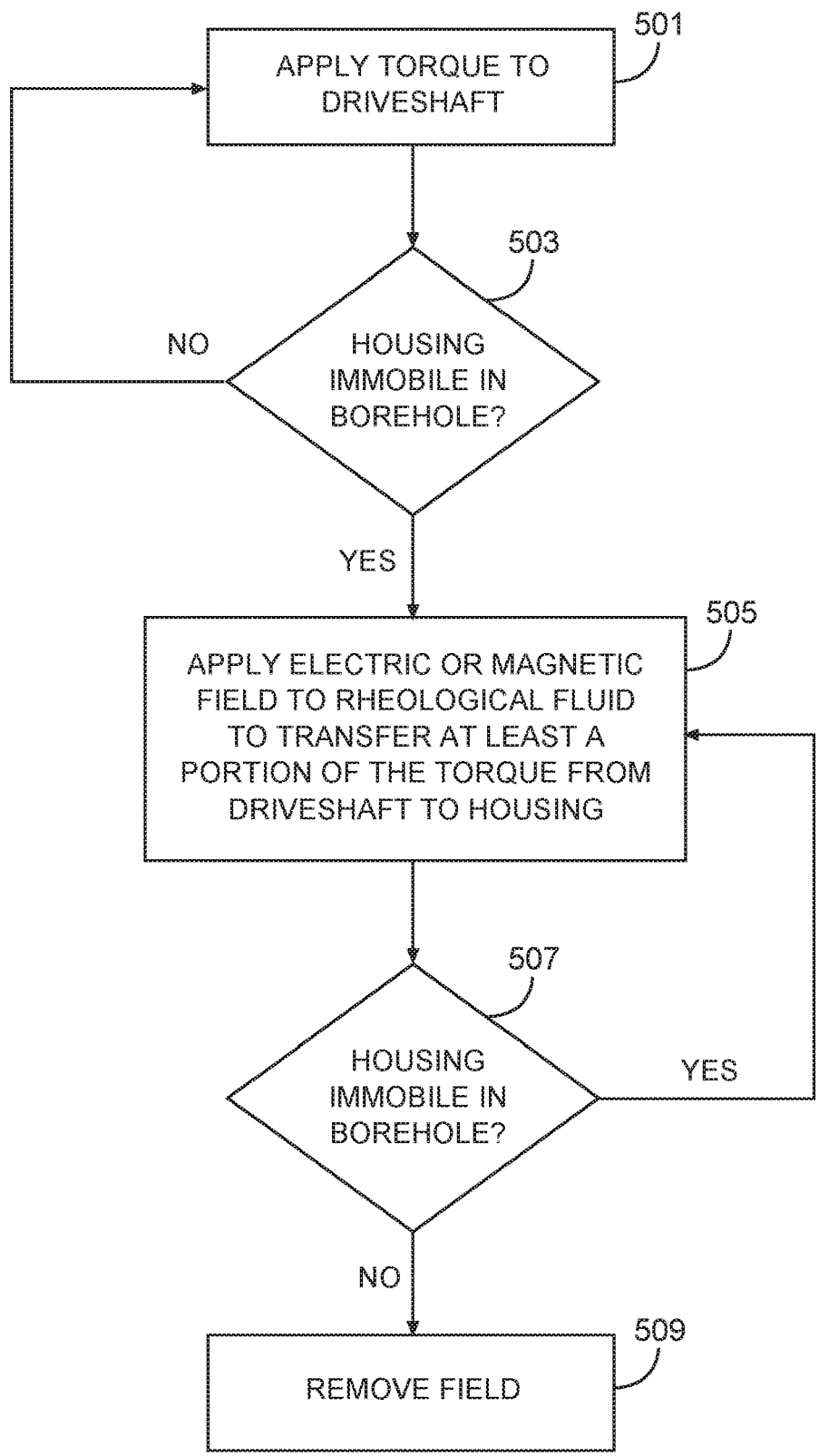
FIG. 5 is a flowchart showing a method for rheological fluid lock of a shaft to a housing, according to various embodiments.

FIG. 5 is a flowchart showing a method for rheological fluid lock of a shaft to a housing, according to various embodiments. In block 501, torque is applied to the driveshaft. This enables the driveshaft to rotate within the housing during the first or inactive mode.

In block 503, the housing is monitored to determine if it is substantially immobile in the borehole. When the housing becomes immobilized in the borehole, the field generator is energized (i.e., second or active mode) to apply the electric or magnetic field to the rheological fluid causing the fluid to transform to a solid or solid-like state in order to transfer at least a portion of the torque from the driveshaft to the housing. In blocks 505 and 507, the field is applied until the housing is able to move within the borehole again. Once the housing is free to move, the field is removed in block 509 by de-energizing the field generator and allowing the rheological fluid to return to its fluid state.

Figure 6:
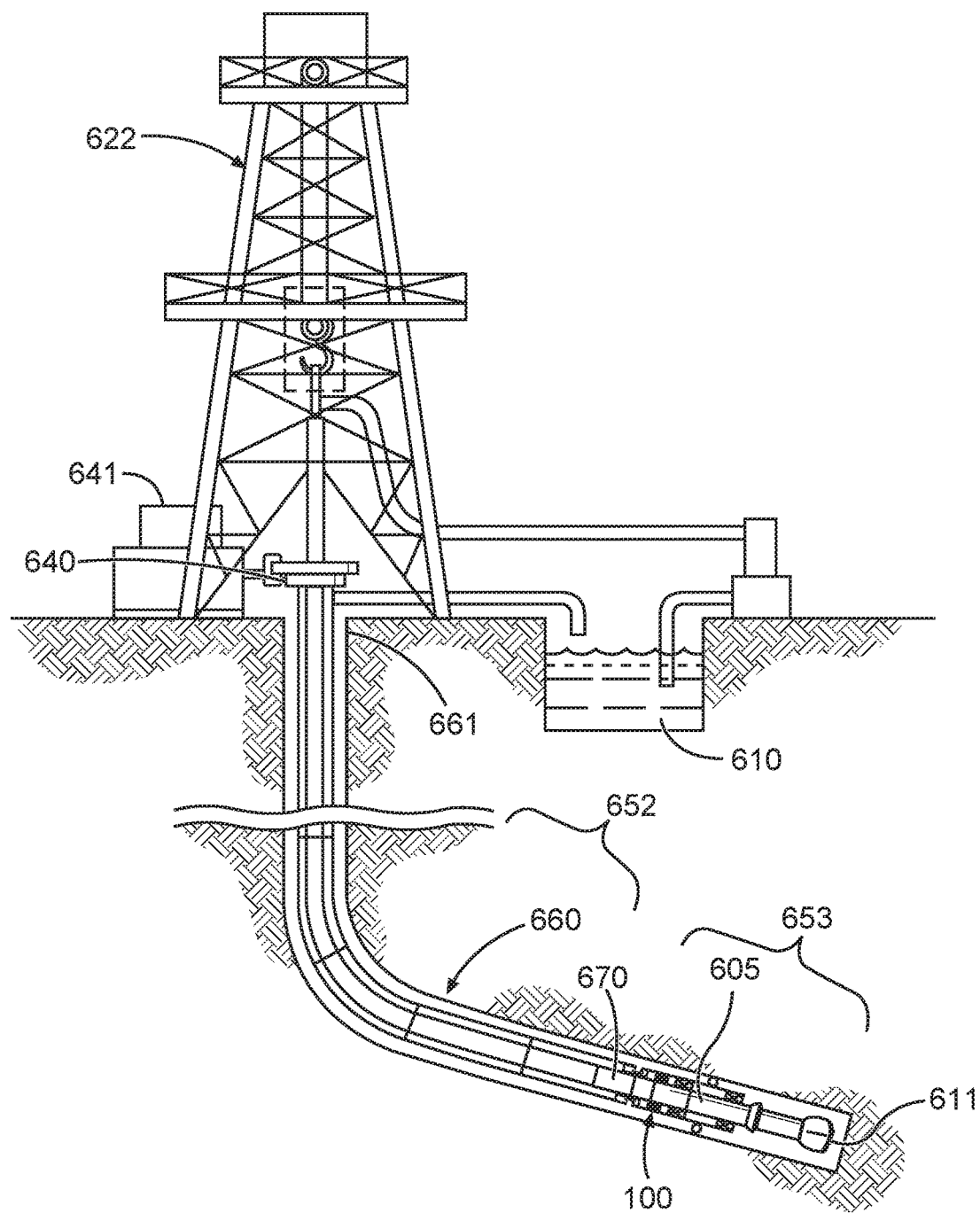
FIG. 6 is a diagram of a drilling system, according to various embodiments.

FIG. 6 is a diagram of a drilling system, according to various embodiments. The BHA 653 is shown at the lower end of the drillstring 660 in a borehole 661. The BHA 653 includes a drill bit 611 disposed at the lower or downhole end of the drillstring 660. The BHA 653 further includes the rheological lock apparatus 100 as discussed previously.

The BHA 653 further includes an RSS 605 that is operatively coupled to between the drill bit 611 and the driveshaft such that rotational forces from the driveshaft are imparted to the operationally coupled parts of the RSS 105 and, in turn, to the drill bit 611. In such embodiments, some portions of the RSS 605 (e.g., its housing and components disposed thereon) may be operated as substantially non-rotating portions.

The drillstring 660 is supported by the drill rig 622 that includes a rotary table 640 for rotating the drill string 660. In some embodiments, the BHA 653 may include a mud motor 670, which may be actuated or otherwise activated so as to impart rotational forces upon the drill bit 611 in addition to or instead of the rotary table 640. The mud motor 670 includes a rotor and a stator that together use the Moineau principle to rotate the drillstring 660 as a result of the pumping of a fluid (e.g., drilling mud) 610 through the mud motor 670.

A controller 640 may be used to control operation of the rheological lock apparatus 100 by energizing and de-energizing the field generator. The controller 640 may also execute the method illustrated in FIG. 5. While the controller 640 is shown on the surface of FIG. 6, other embodiments may locate the controller 640 downhole in the BHA 653 or other locations of the drillstring 660.

Example 1 is a rheological lock apparatus comprising: a fluid chamber formed within a housing between a pair of seals, the fluid chamber comprising a rheological fluid, the housing having an inner surface with a first plurality of splines projecting into the fluid chamber and extending longitudinally along a longitudinal dimension of the chamber; a driveshaft extending axially through the chamber such that the pair of seals are sealed against the driveshaft, the driveshaft comprising a second plurality of splines; and a field generator coupled to one of the driveshaft or the housing and configured to generate a field through the rheological fluid.

In Example 2, the subject matter of Example 1 can include wherein the rheological fluid is an electrorheological fluid and the field generator is an electric field generator.

In Example 3, the subject matter of Examples 1-2 can include wherein the rheological fluid is a magnetorheological fluid.

In Example 4, the subject matter of Examples 1-3 can include wherein the rheological fluid is configured to couple torque from the driveshaft to the housing in a first mode and permit rotation of the driveshaft within the housing in a second mode.

In Example 5, the subject matter of Examples 1-4 can include wherein the field generator is configured to be enabled to activate the first mode and disabled to activate the second mode.

In Example 6, the subject matter of Examples 1-5 can include wherein the first plurality of splines are integral with the housing.

In Example 7, the subject matter of Examples 1-6 can include wherein the second plurality of splines are integral with the driveshaft.

In Example 8, the subject matter of Examples 1-7 can include wherein the fluid chamber is less than an entire length of the housing.

In Example 9, the subject matter of Examples 1-8 can include bearings coupled to the inner surface.

In Example 10, the subject matter of Examples 1-9 can include wherein the bearings comprise spherical bearings configured to locate the driveshaft axially within the housing along the longitudinal dimension and permit relative rotation between the housing and the driveshaft.

Example 11 is a method for drilling a borehole, the method comprising: applying a torque to a driveshaft to rotate the driveshaft within a housing during a first mode of operation; and applying a field to a rheological fluid sealed in a chamber of the housing, during a second mode of operation, such that a solid-like state of the rheological fluid, in response to the field, transfers at least a portion of the torque to the housing.

In Example 12, the subject matter of Example 11 can include wherein applying the field to the rheological fluid comprises applying the field when the housing is substantially immobile within the borehole.

In Example 13, the subject matter of Examples 11-12 can include removing the field when the housing is not substantially immobile within the borehole.

In Example 14, the subject matter of Examples 11-13 can include wherein, during the second mode of operation, a first plurality of splines coupled to an outer surface of the driveshaft transfers at least the portion of the torque to the rheological fluid in the solid-like state and the rheological fluid transfers at least the portion of the torque to a second plurality of splines coupled to an inner surface of the housing.

In Example 15, the subject matter of Examples 11-14 can include applying the torque to the driveshaft to rotate a drill bit coupled to the driveshaft.

Example 16 is a drilling system comprising: a bottom hole assembly comprising: a drillstring coupled to a motor or a rotation table that are configured to provide a torque to the drillstring; a driveshaft coupled between the drillstring and a drill bit to transfer the torque to the drill bit, the driveshaft configured to rotate axially within a housing, the driveshaft comprising a first plurality of splines projecting into the housing and the housing comprising a second plurality of splines projecting towards the driveshaft; and a rheological lock apparatus comprising: a chamber formed between a pair of seals within the housing and comprising a rheological fluid, the driveshaft extending longitudinally through the housing and through the pair of seals such that the seals are sealed against the driveshaft; and a field generator coupled to one of the housing or the driveshaft and configured to generate a field into the rheological fluid.

In Example 17, the subject matter of Example 16 can include wherein the field generator is located in the housing.

In Example 18, the subject matter of Examples 16-17 can include wherein the field generator is located in the driveshaft.

In Example 19, the subject matter of Examples 16-18 can include wherein the field generator is located such that the field is generated axially between the housing and the driveshaft.

In Example 20, the subject matter of Examples 16-19 can include wherein the field generator is dynamically controllable in response to a mobility of the housing relative to a borehole in which the bottom hole assembly is located.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A rheological lock apparatus for use in a borehole, comprising:
    a fluid chamber formed within a housing between a pair of seals, the fluid chamber comprising a rheological fluid, the housing having an inner surface with a first plurality of splines projecting into the fluid chamber and extending longitudinally along a longitudinal dimension of the chamber;
    a driveshaft extending axially through the chamber such that the pair of seals are sealed against the driveshaft, the driveshaft comprising a second plurality of splines; and
    a field generator coupled to one of the driveshaft or the housing and configured to generate a field through the rheological fluid, wherein the field generator is dynamically controllable in response to a mobility of the housing relative to the borehole.

2. The rheological lock apparatus of claim 1, wherein the rheological fluid is an electrorheological fluid and the field generator is an electric field generator.

3. The rheological lock apparatus of claim 1, wherein the rheological fluid is a magnetorheological fluid.

4. The rheological lock apparatus of claim 1, wherein the rheological fluid is configured to couple torque from the driveshaft to the housing in a first mode and permit rotation of the driveshaft within the housing in a second mode.

5. The rheological lock apparatus of claim 4, wherein the field generator is configured to be enabled to activate the first mode and disabled to activate the second mode.

6. The rheological lock apparatus of claim 1, wherein the first plurality of splines are integral with the housing.

7. The rheological lock apparatus of claim 1, wherein the second plurality of splines are integral with the driveshaft.

8. The rheological lock apparatus of claim 1, wherein the fluid chamber is less than an entire length of the housing.

9. The rheological lock apparatus of claim 1, further comprising bearings coupled to the inner surface.

10. The rheological lock apparatus of claim 9, wherein the bearings comprise spherical bearings configured to locate the driveshaft axially within the housing along the longitudinal dimension and permit relative rotation between the housing and the driveshaft.

11. A method for drilling a borehole, the method comprising:
    applying a torque to a driveshaft to rotate the driveshaft within a housing during a first mode of operation;
    generating a field to a rheological fluid sealed in a chamber of the housing with a field generator dynamically controllable in response to a mobility of the housing relative to the borehole; and
    applying the field to the rheological fluid sealed in the chamber of the housing, during a second mode of operation, such that a solid-like state of the rheological fluid, in response to the field, transfers at least a portion of the torque to the housing.

12. The method of claim 11, wherein applying the field to the rheological fluid comprises applying the field when the housing is substantially immobile within the borehole.

13. The method of claim 12, further comprising removing the field when the housing is not substantially immobile within the borehole.

14. The method of claim 11, wherein, during the second mode of operation, a first plurality of splines coupled to an outer surface of the driveshaft transfers at least the portion of the torque to the rheological fluid in the solid-like state and the rheological fluid transfers at least the portion of the torque to a second plurality of splines coupled to an inner surface of the housing.

15. The method of claim 11, further comprising applying the torque to the driveshaft to rotate a drill bit coupled to the driveshaft.

16. A drilling system for use in a borehole, comprising:
a bottom hole assembly locatable in the borehole and comprising:
a drillstring coupled to a motor or a rotation table that are configured to provide a torque to the drillstring;
a driveshaft coupled between the drillstring and a drill bit to transfer the torque to the drill bit, the driveshaft configured to rotate axially within a housing, the driveshaft comprising a first plurality of splines projecting into the housing and the housing comprising a second plurality of splines projecting towards the driveshaft; and
a rheological lock apparatus comprising:
a chamber formed between a pair of seals within the housing and comprising a rheological fluid, the driveshaft extending longitudinally through the housing and through the pair of seals such that the seals are sealed against the driveshaft; and
a field generator coupled to one of the housing or the driveshaft and configured to generate a field into the rheological fluid, wherein the field generator is dynamically controllable in response to a mobility of the housing relative to the borehole in which the bottom hole assembly is located.

17. The drilling system of claim 16, wherein the field generator is located in the housing.

18. The drilling system of claim 16, wherein the field generator is located in the driveshaft.

19. The drilling system of claim 16, wherein the field generator is located such that the field is generated axially between the housing and the driveshaft.

* * * * *